(12) United States Patent
Huang et al.

(10) Patent No.: US 9,413,401 B2
(45) Date of Patent: Aug. 9, 2016

(54) METHOD FOR MEASURING CO-CHANNEL SIGNAL INTERFERENCE, AND RECEIVER

(71) Applicant: Huawei Technologies Co., Ltd., Shenzhen (CN)

(72) Inventors: Xiongbin Huang, Chengdu (CN); Dejun Li, Chengdu (CN); Qilin Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/725,984

(22) Filed: May 29, 2015

(65) Prior Publication Data

US 2015/0263770 A1   Sep. 17, 2015

Related U.S. Application Data

(63) Continuation of application No. PCT/CN2013/088172, filed on Nov. 29, 2013.

(30) Foreign Application Priority Data

Nov. 29, 2012   (CN) .......................... 2012 1 0497166

(51) Int. Cl.
*H04B 17/00* (2015.01)
*H04B 1/10* (2006.01)
*H04B 17/336* (2015.01)
*H04B 17/345* (2015.01)

(52) U.S. Cl.
CPC ............ *H04B 1/1027* (2013.01); *H04B 17/336* (2015.01); *H04B 17/345* (2015.01); *H04B 2001/1045* (2013.01)

(58) Field of Classification Search
CPC ...... H04B 1/109; H04B 17/21; H04B 17/309; H04B 2001/1045
USPC ............................................ 455/226.1, 226.3
See application file for complete search history.

(56) References Cited

U.S. PATENT DOCUMENTS

| | | | | |
|---|---|---|---|---|
| 4,723,303 | A * | 2/1988 | Koch | H04B 17/327 324/613 |
| 6,714,609 | B1 | 3/2004 | Keisala | |
| 6,741,866 | B1 | 5/2004 | Gustavsson | |
| 2003/0207674 | A1* | 11/2003 | Hughes | H03G 3/3068 455/234.1 |

(Continued)

FOREIGN PATENT DOCUMENTS

| CN | 1478333 A | 2/2004 |
|---|---|---|
| CN | 101808350 A | 8/2010 |

(Continued)

*Primary Examiner* — Simon Nguyen
(74) *Attorney, Agent, or Firm* — Slater Matsil, LLP

(57) ABSTRACT

Embodiments of the present invention provide a method for measuring co-channel signal interference, and a receiver, where the method includes precisely obtaining, by measuring temperature and by using a stored noise figure, a signal to noise ratio of a low power signal in a case in which there is no co-channel signal interference; obtaining, by controlling a transmit power, at least one group of receive powers and signal to noise ratios of the receiver, to obtain a signal to noise ratio of the low power signal during actual operation; and calculating an interference power according to a difference between the signal to noise ratio of the low power signal in a case in which there is no co-channel interference and the signal to noise ratio of the low power signal during actual operation.

14 Claims, 6 Drawing Sheets

(56) References Cited

U.S. PATENT DOCUMENTS

| | | |
|---|---|---|
| 2004/0023627 A1 | 2/2004 | Osaki et al. |
| 2007/0054700 A1 | 3/2007 | Hovers et al. |
| 2007/0268960 A1* | 11/2007 | Jia .................... G01S 19/28 375/147 |
| 2008/0194221 A1* | 8/2008 | Uramoto ............. H04B 1/123 455/226.1 |
| 2008/0226000 A1* | 9/2008 | Meyer ................. H04L 1/20 375/347 |
| 2009/0247086 A1 | 10/2009 | Lin et al. |
| 2009/0264088 A1* | 10/2009 | Li ....................... H04B 1/1027 455/114.2 |
| 2010/0158171 A1* | 6/2010 | Safavi ................. H04L 1/20 375/346 |
| 2014/0065994 A1* | 3/2014 | Young ................. H04B 17/004 455/226.3 |

FOREIGN PATENT DOCUMENTS

| | | |
|---|---|---|
| CN | 101860509 A | 10/2010 |
| CN | 101960747 A | 1/2011 |
| CN | 102983922 A | 3/2013 |
| EP | 1100211 A1 | 5/2001 |

\* cited by examiner

US 9,413,401 B2

METHOD FOR MEASURING CO-CHANNEL SIGNAL INTERFERENCE, AND RECEIVER

This application is a continuation of International Application No. PCT/CN2013/088172, filed on Nov. 29, 2013, which claims priority to Chinese Patent Application No. 201210497166.X, filed on Nov. 29, 2012, both of which are hereby incorporated by reference in their entireties.

TECHNICAL FIELD

The present invention relates to the communications field, and in particular, to a method for measuring co-channel signal interference, and a receiver.

BACKGROUND

When a microwave system propagates a signal in free space, propagation of the signal is affected by free space attenuation, rain attenuation, atmospheric absorption, multipath attenuation, and the like. Under normal conditions, only normal attenuation, such as the free space attenuation and the atmospheric absorption attenuation, occurs. In this case, a power of a signal that reaches a receiver is far greater than a receiver sensitivity power (a sensitivity power is defined as a minimum receive power that ensures normal transmission of a signal, and receive power that results in a system bit error rate of 1E−6 is usually used to weigh sensitivity), and the system can work normally. Under adverse weather conditions, abnormal attenuation, such as the rain attenuation and the multipath attenuation, occurs at the same time, and the receive power decreases significantly. When the receive power decreases below the receiver sensitivity power, the system cannot properly transmit the signal, and the system enters an unavailable state. In order to reduce total unavailable time of the system as much as possible, a link planner of the microwave system generally designs a normal receive power to be far greater than the sensitivity power, and a part of the normal receive power in excess of the sensitivity power is referred to as fade margin, which is used to resist abnormal attenuation such as the rain attenuation and the multipath attenuation under adverse conditions.

The sensitivity power of the microwave system mainly depends on performance of the system itself, but when the microwave system is affected by interference from a signal that operates at a same frequency and is from another receiver, sensitivity of the microwave system deteriorates. At this time, effective fade margin of the microwave system reduces, and the overall availability decreases. Therefore, a microwave network planner expects to know whether a current microwave link is affected by co-channel interference, and assesses whether the interference is within an acceptable range.

In prior art 1, a transmitter transmits a signal with an operating frequency of the transmitter, while a receiver receives a signal with a same frequency; the transmitter that is working is set to off, so that the transmitter stops transmitting any signal; at this time, the receiver detects a power of the received signal with the operating frequency, and if the power is detected, it is considered that the detected power is a power of a signal from another receiver, that is, co-channel interference power. Low power interference cannot be detected by using this method. Due to the reason of costs, a minimum receive power that can be detected by a receiver of the microwave system is around −90 dBm (Decibel Referenced to one milliwatt, dBm), and detection of a lower power will lead to a significant increase in costs. Therefore, a minimum interference power that can be measured in the above technical solution can only be around −90 dBm. However, an interference detection capability of −90 dBm is often insufficient, as co-channel interference less than −90 dBm also leads to significant sensitivity deterioration of the microwave system.

Meanwhile, in prior art 2, a transmitter transmits a signal with an operating frequency of the transmitter, while a receiver receives a signal with a same frequency; the operating transmitter gradually decreases its transmit power, and a receive power of the receiver also decreases at the same time. At the same time, the system gradually produces a bit error. When a bit error rate of the receiver reaches 1E−6, the receive power is equal to an actual sensitivity power at this time. Whether frequency interference exists at this time may be learned by determining whether the sensitivity power deteriorates at the time. In addition, an interference power value can be calculated according to an extent of sensitivity deterioration. The transmitter in the method requires a relatively large transmit power adjustment range, for example, an adjustment range greater than 40 dB (Decibel, dB), so that the receive power of the receiver can decrease to a level of the sensitivity power by adjusting the transmit power of the transmitter. However, costs for implementing a power adjustment range of 40 dB for a transmitter are relatively high; in addition, according to the method, whether the receive power reaches the receiver sensitivity is determined by observing the bit error rate of the system. Because observation of the bit error rate is a time-consuming process, measurement time in prior art 2 is relatively long.

SUMMARY

Embodiments of the present invention provide a method for measuring co-channel signal interference, where the method implements convenient measurement of whether a microwave link is affected by co-channel interference and measurement of a co-channel interference power.

According to a first aspect, a method for measuring co-channel signal interference includes measuring temperature of an amplifier AMP of a receiver, and calculating, according to the temperature and a prestored noise figure of the receiver, a signal to noise ratio of a demodulator DEM of the receiver when the receiver receives a low power signal in a case in which there is no co-channel signal interference, measuring several groups of receive powers and signal to noise ratios of the receiver, where each group includes two signal to noise ratios and receive powers corresponding to the two signal to noise ratios, and a difference between the two signal to noise ratios of each group is equal to or greater than 2 dB, and calculating, according to the several groups of receive powers and signal to noise ratios of the receiver, a signal to noise ratio of the low power signal during actual operation of the receiver, obtaining, according to the signal to noise ratio of the low power signal in a case in which there is no co-channel signal interference and according to the signal to noise ratio of the low power signal during actual operation, interference noise of the co-channel signal interference, and obtaining, according to the interference noise of the co-channel signal interference, an interference power of the co-channel signal interference by using a power superposition algorithm.

With reference to the first aspect, in a first possible implementation manner of the first aspect, the measuring temperature of a receiver, and calculating, according to the temperature and a prestored noise figure, a signal to noise ratio of a low power signal in a case in which there is no co-channel signal interference includes measuring temperature t of the receiver, and calculating, according to t, the prestored noise figure NF, and a total signal to noise ratio formula SNR=S−

Nth, the signal to noise ratio SNRA of the low power signal in a case in which there is no co-channel signal interference, where SNRA=SA−(10*log(k*t*b)+NF), k is a Boltzmann's constant, t is absolute temperature, b is equivalent noise bandwidth, NF is the noise figure, and SA is a power of the low power signal received by the receiver.

With reference to the first aspect or the first possible implementation manner of the first aspect, in a second possible implementation manner of the first aspect, the measuring several groups of receive powers and signal to noise ratios of the receiver, where each group includes two signal to noise ratios and receive powers corresponding to the two signal to noise ratios, and a difference between the two signal to noise ratios of each group is equal to or greater than 2 dB, and calculating, according to the several groups of receive powers and signal to noise ratios of the receiver, a signal to noise ratio of the low power signal during actual operation of the receiver includes measuring at least one group of receive powers and signal to noise ratios of the receiver, where each group includes two signal to noise ratios and receive powers corresponding to the two signal to noise ratios, and a difference between the two signal to noise ratios of each group is equal to or greater than 2 dB, calculating, according to each group of receive powers and signal to noise ratios of the receiver, each group of signal to noise ratios of the low power signal during actual operation of the receiver, and averaging the at least one group of obtained signal to noise ratios of the low power signal during actual operation, to obtain the signal to noise ratio of the low power signal during actual operation of the receiver.

With reference to the first aspect or the first possible implementation manner of the first aspect, in a third possible implementation manner of the first aspect, the measuring several groups of receive powers and signal to noise ratios of the receiver, where each group includes two signal to noise ratios and receive powers corresponding to the two signal to noise ratios, and a difference between the two signal to noise ratios of each group is equal to or greater than 2 dB, and calculating, according to the several groups of receive powers and signal to noise ratios of the receiver, a signal to noise ratio of the low power signal during actual operation of the receiver includes measuring one group of receive powers and signal to noise ratios of the receiver, where (s1, snr1) and (s2, snr2) are obtained, obtaining snr1=s1/(x+y*s1) and snr2=s2/(x+y*s2) according to a total signal to noise ratio formula snr=s/(x+y*s), where x is signal-independent noise, and y is signal-dependent noise, obtaining the following formula according to the one group of receive powers and signal to noise ratios of the receiver:

$$x = \frac{(snr2 - snr1) * s1 * s2}{(s2 - s1) * snr1 * snr2},$$

and obtaining the following formula according to SNRB=10*log(sa)−10*log x:

$$SNRB = 10 * \log\left(\frac{sa * snr1 * snr2 * (s2 - s1)}{s1 * s2 * (snr2 - snr1)}\right),$$

where SA=10*log(sa).

With reference to the first aspect or the first possible implementation manner of the first aspect, in a fourth possible implementation manner of the first aspect, the measuring several groups of receive powers and signal to noise ratios of the receiver, where each group includes two signal to noise ratios and receive powers corresponding to the two signal to noise ratios, and a difference between the two signal to noise ratios of each group is equal to or greater than 2 dB, and calculating, according to the several groups of receive powers and signal to noise ratios of the receiver, a signal to noise ratio of the low power signal during actual operation of the receiver includes measuring one group of a minimum receive power and a signal to noise ratio of the receiver as well as a maximum receive power and a signal to noise ratio of the receiver, where $(s_{min}, snr_{min})$ and $(s_{max}, snr_{max})$ are obtained, obtaining $snr_{min}=s_{min}/(x+y*s_{min})$ and $snr_{max}=s_{max}/(x+y*s_{max})$ according to a total signal to noise ratio formula snr=s/(x+y*s), obtaining the following formula according to the one group of receive powers and signal to noise ratios of the receiver:

$$x = \frac{(snr_{max} - snr_{min}) * s_{min} * s_{max}}{(s_{max} - s_{min}) * snr_{min} * snr_{max}},$$

and obtaining the following formula according to SNRB=10*log(sa)−10*log x:

$$SNRB = 10 * \log\left(\frac{sa * snr_{min} * snr_{max} * (s_{max} - s_{min})}{s_{min} * s_{max} * (snr_{max} - snr_{min})}\right),$$

where SA=10*log(sa).

With reference to the first aspect or the first possible implementation manner of the first aspect or the second implementation manner of the first aspect or the third possible implementation manner of the first aspect or the fourth implementation manner of the first aspect, in a fifth possible implementation manner of the first aspect, the obtaining, according to the signal to noise ratio of the low power signal in a case in which there is no co-channel signal interference and according to the signal to noise ratio of the low power signal during actual operation, interference noise includes obtaining the interference noise DS according to DS=SNRA−SNRB.

With reference to the fifth implementation manner of the first aspect, in a sixth possible implementation manner of the first aspect, the obtaining, according to the interference noise, an interference power by using a power superposition algorithm includes obtaining the power superposition algorithm according to that total noise caused by co-channel interference is equal to thermal noise plus interference noise:

$$10^{\frac{Nth}{10}} + 10^{\frac{I}{10}} = 10^{\frac{Nth+DS}{10}},$$

and obtaining the interference power according to the power superposition algorithm:

$$I = 10 * \log\left(10^{\frac{Nth+DS}{10}} - 10^{\frac{Nth}{10}}\right),$$

where Nth is thermal noise, I is the interference power, and Nth+DS is the total noise caused by the co-channel interference.

According to a second aspect, a receiver is provided, where the receiver includes a first calculating unit configured to measure temperature of an amplifier AMP of a receiver, and calculate, according to the temperature and a prestored noise figure of the receiver, a signal to noise ratio of a demodulator DEM of the receiver when the receiver receives a low power signal in a case in which there is no co-channel signal interference, a second calculating unit configured to measure several groups of receive powers and signal to noise ratios of the receiver, where each group includes two signal to noise ratios and receive powers corresponding to the two signal to noise ratios, and a difference between the two signal to noise ratios of each group is equal to or greater than 2 dB, and calculate, according to the several groups of receive powers and signal to noise ratios of the receiver, a signal to noise ratio of the low power signal during actual operation of the receiver, a third calculating unit configured to obtain, according to the signal to noise ratio of the low power signal in a case in which there is no co-channel signal interference and according to the signal to noise ratio of the low power signal during actual operation, interference noise of the co-channel signal interference, and a fourth calculating unit configured to obtain, according to the interference noise of the co-channel signal interference, an interference power of the co-channel signal interference by using a power superposition algorithm.

With reference to the second aspect, in a first possible implementation manner of the second aspect, the first calculating unit is configured to measure temperature t of the receiver, and calculate, according to t, the prestored noise figure NF, and a total signal to noise ratio formula SNR=S−Nth, the signal to noise ratio SNRA of the low power signal in a case in which there is no co-channel signal interference, where SNRA=SA−(10*log(k*t*b)+NF), k is a Boltzmann's constant, t is absolute temperature, b is equivalent noise bandwidth, NF is the noise figure, and SA is a power of the low power signal received by the receiver.

With reference to the second aspect or the first possible implementation manner of the second aspect, in a second possible implementation manner of the second aspect, the second calculating unit includes a first measurement unit configured to measure at least one group of receive powers and signal to noise ratios of the receiver, where each group includes two signal to noise ratios and receive powers corresponding to the two signal to noise ratios, and a difference between the two signal to noise ratios of each group is equal to or greater than 2 dB, a fifth calculating unit, configured to calculate, according to each group of receive powers and signal to noise ratios of the receiver, each group of signal to noise ratios of the low power signal during actual operation of the receiver, and a first averaging unit configured to average the at least one group of obtained signal to noise ratios of the low power signal during actual operation, to obtain the signal to noise ratio of the low power signal during actual operation of the receiver.

With reference to the second aspect or the first possible implementation manner of the second aspect, in a third possible implementation manner of the second aspect, the second calculating unit includes a second measurement unit, configured to measure one group of receive powers and signal to noise ratios of the receiver, where (s1, snr1) and (s2, snr2) are obtained, and a sixth calculating unit configured to: obtain snr1=s1/(x+y*s1) and snr2=s2/(x+y*s2) according to a total signal to noise ratio formula snr=s/(x+y*s), where x is signal-independent noise, and y is signal-dependent noise, obtain the following formula according to the one group of receive powers and signal to noise ratios of the receiver:

$$x = \frac{(snr2 - snr1)*s1*s2}{(s2 - s1)*snr1*snr2},$$

and obtain, according to SNRB=10*log(sa)−10*log x, the following formula:

$$SNRB = 10*\log\left(\frac{sa*snr1*snr2*(s2-s1)}{s1*s2*(snr2-snr1)}\right),$$

where SA=10*log(sa).

With reference to the second aspect or the first possible implementation manner of the second aspect, in a fourth possible implementation manner of the second aspect, the second calculating unit includes a third measurement unit, configured to measure one group of a minimum receive power and a signal to noise ratio of the receiver as well as a maximum receive power and a signal to noise ratio of the receiver, where $(s_{min}, snr_{min})$ and $(s_{max}, snr_{max})$ are obtained and a seventh calculating unit configured to: obtain $snr_{min}=s_{min}/(x+y*s_{min})$ and $snr_{max}=s_{max}/(x+y*s_{max})$ according to a total signal to noise ratio formula snr=s/(x+y*s), obtain the following formula according to the one group of receive powers and signal to noise ratios of the receiver:

$$x = \frac{(snr_{max} - snr_{min})*s_{min}*s_{max}}{(s_{max} - s_{min})*snr_{min}*snr_{max}},$$

and obtain the following formula according to SNRB=10*log (sa)−10*log x:

$$SNRB = 10*\log\left(\frac{sa*snr_{min}*snr_{max}*(s_{max}-s_{min})}{s_{min}*s_{max}*(snr_{max}-snr_{min})}\right),$$

where SA=10*log(sa).

With reference to the second aspect or the first possible implementation manner of the second aspect or the second possible implementation manner of the second aspect or the third possible implementation manner of the second aspect or the fourth possible implementation manner of the second aspect, in a fifth possible implementation manner of the second aspect, the third calculating unit includes obtaining the interference noise DS according to DS=SNRA−SNRB.

With reference to the fifth possible implementation manner of the second aspect, in a sixth possible implementation manner of the second aspect, the fourth calculating unit includes obtaining the power superposition algorithm according to that total noise caused by co-channel interference is equal to thermal noise plus interference noise:

$$10^{\frac{Nth}{10}} + 10^{\frac{I}{10}} = 10^{\frac{Nth+DS}{10}},$$

and obtaining the interference power according to the power superposition algorithm:

$$I = 10*\log\left(10^{\frac{Nth+DS}{10}} - 10^{\frac{Nth}{10}}\right),$$

where Nth is thermal noise, I is the interference power, and Nth+DS is the total noise caused by the co-channel interference.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

The following descriptions are merely exemplary embodiments of the present invention, but are not intended to limit the present invention. Any modification, equivalent replacement, and improvement made without departing from the spirit and principle of the present invention shall fall within the protection scope of the present invention.

Embodiment 1

Figure 1:
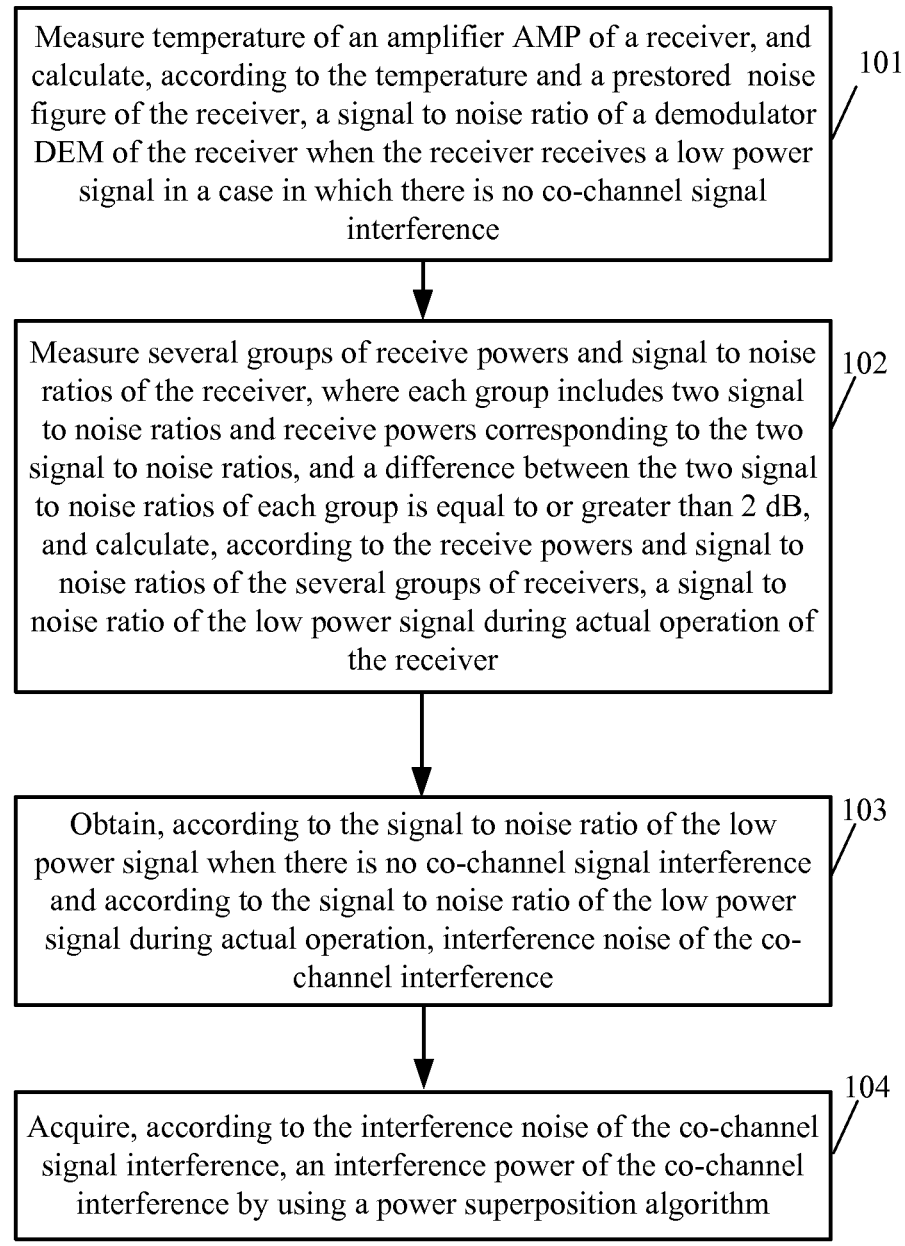
FIG. 1 is a flowchart of a method for measuring co-channel signal interference according to Embodiment 1 of the present invention.

Referring to FIG. 1, FIG. 1 is a flowchart of a method for measuring co-channel signal interference according to Embodiment 1 of the present invention. As shown in FIG. 1, the method includes the following steps:

Step 101. Measure temperature of an amplifier AMP of a receiver, and calculate, according to the temperature and a prestored noise figure of the receiver, a signal to noise ratio of a demodulator DEM of the receiver when the receiver receives a low power signal in a case in which there is no co-channel signal interference.

When a signal received by the receiver is a low power signal, the signal to noise ratio of the DEM of the receiver approximates signal-independent noise.

Specifically, in the following descriptions, each physical variable uses two scaling methods: one is a linear scale, a power unit mw, for example, and this scale is expressed by using lowercase letters; the other is a decibel scale, a power unit dBm, for example, and this scale is expressed by using uppercase letters. For example, s indicates a linear-scale signal power in the unit of mw; S indicates a decibel-scale signal power in the unit of dBm; and a relationship between the two is: $S=10*\log(s)$.

In a microwave transmission system, a signal that is received by the receiver and transmitted by a transmitter is affected by the following types of noise: thermal noise; interference signal noise; and internal noise of the system, including: nonlinear noise, phase noise, analog to digital (AD) sampling quantization noise, and noise of inphase component and quadrature component (IQ) imbalance in quadrature amplitude modulation (QAM).

The nonlinear noise includes nonlinear noise of the transmitter and nonlinear noise of the receiver. The nonlinear noise of the transmitter is mainly from a power amplifier (PA). The higher the power is, the higher the nonlinear noise will be. Impact of the nonlinear noise of the PA can be reduced to a sufficiently low or even a negligible level by appropriate back-off of a transmit power. Therefore, the nonlinear noise of the receiver is a major concern. The nonlinear noise of the receiver is from amplifiers at various stages in the receiver. The receiver usually controls, by using an automatic gain control unit (AGC) circuit, input power of the amplifiers at various stages so that the amplifiers operate in a linear range, and total nonlinear noise maintains relatively constant and satisfies a requirement of the system. A signal to noise ratio of the nonlinear noise is generally indicated by third-order intermodulation distortion (IMD).

The phase noise is from frequency generators at various levels in the system. What finally matters is a sum of the phase noise, which can be expressed as: $L(f)=a/(f^2)$. This is a phase noise curve, and impact of the sum of the phase noise on the signal to noise ratio is assessed by using a curve integral. A carrier recovery loop in a receiving demodulation circuit filters the phase noise, and a final signal to noise ratio of integral phase noise is equal to $ipn=4*a*(1/fc-1/fs)$, where a is a factor related to a phase noise value, f is frequency, fc is cut-off frequency of the carrier recovery loop, and fs is symbol bandwidth of a signal.

The AD sampling quantization noise originates from digital AD sampling of the receiver. Because a sampling resolution of an AD chip is limited, quantization processing is performed during sampling, and an error between a digital signal value after the sampling and a sampled analog signal value becomes quantization noise, whose signal to noise ratio is equal to a signal to quantization noise ratio (SQNR), that is, $6.02*q$, where a unit is dB, and q is the number of bits of the AD chip. A 10-bit AD chip is used as an example, and a signal to quantization noise ratio is: $6.02*10=60.2$ dB. When the SQNR is converted into a linear scale unit, $sqnr=10^{\wedge}(SQNR/10)$.

The inphase component and quadrature component (IQ) imbalance refers to inconsistency of amplitude and phases of an I signal and a Q signal due to different paths during IQ modulation. Consequently, a modulation signal deviates from an ideal location in a constellation diagram, and a signal to noise ratio caused by the IQ imbalance may be measured by evm.

After a noise factor f deteriorates when thermal noise passes the receiver, a value of the thermal noise is equal to $k*t*b*f$, where k is a Boltzmann's constant, t is absolute temperature, f is the noise factor, and a relationship between the noise factor and a noise figure NF is: Noise figure (NF) $=10*\log f$.

The interference noise is from outside of the system, which is unknown and is supposed to be i.

A total signal to noise ratio (signal to noise ratio, snr) of the signal is equal to a ratio of a signal power to a sum of the foregoing noise powers: $snr=s/(k*t*b*f+i+(1/imd+1/ipn+1/sqnr+1/evm)*s)$, where s is the signal power.

The total noise is expressed as a signal-dependent part and a signal-independent part, which are $y*s$ and x, respectively, where $y=1/imd+1/ipn+1/sqnr+1/evm$, and $x=k*t*b*f+i$. The total signal to noise ratio is: $snr=s/(x+y*s)$. This equation indicates that the total signal to noise ratio is the signal to noise ratio of the receiver.

Acquisition of the total noise can be achieved. The total noise is the signal-independent noise x plus the signal-dependent noise $y*s$. The signal-independent noise is the thermal noise $k*t*b*f$ in a case in which there is no co-channel signal interference.

Temperature t of the receiver is measured. According to t, a prestored noise figure NF, and a total signal to noise ratio formula SNR=S−Nth, where $S=10*\log(s)$, $Nth=10*\log(x+y*s)=10*\log(k*t*b*f+i+y*s)$, and $y*s$ approximates 0 when the receiver receives a low power signal, and i=0 in a case in which there is no co-channel signal interference during calculation, the signal to noise ratio SNRA of the low power signal is calculated, where SNRA=SA−Nth, $Nth=10*\log(k*t*b*f)=10*\log(k*t*b)+NF$, k is a Boltzmann's constant, t is absolute temperature, b is equivalent noise bandwidth, f is the noise factor, and SA is a power of the low power signal received by the receiver.

When the power of the signal received by the receiver is relatively low, the noise of the receiver approximates signal-independent noise, that is, $x+y*s \approx x=k*t*b*f+i$, and the noise is denoted by low power signal noise. According to the low power signal noise, a signal to noise ratio equation of the low power signal of the receiver is created, that is, $snrx=s/(x+y*s) \approx s/x$. In a case in which there is no co-channel interference, the signal to noise ratio of the receiver is $snrx=s/(k*t*b*f)$, i=0. When the signal to noise ratio is converted into a dB scale unit and it is supposed that $Nth=10*\log(k*t*b*f)$, SNR=S−Nth. It indicates that a changing relationship of 1 dB:1 dB exists between the signal power and the signal to noise ratio in the case of the low power signal, that is, each 1 dB change in the signal power change leads to a 1 dB change in the signal to noise ratio. It is represented by a straight line with a positive 45° slope in a two-dimensional diagram.

When the power of the signal received by the receiver is relatively high, the noise of the receiver approximates signal-dependent noise, that is, $x+y*s \approx y*s$, and the noise is denoted by high power signal noise. According to the high power signal noise, a signal to noise ratio equation of the high power signal of the receiver is created, that is, $snry=s/(x+y*s) \approx s/(y*s)$. When the signal to noise ratio is converted into a dB scale unit, $SNR=10*\log(1/y)$, which is a constant irrelevant to the signal power.

In view of these two cases, a relationship between SNR and S may be shown in a two-dimensional diagram. For details, refer to FIG. 2.

Specifically, the signal to noise ratio equation of the low power signal is $snrx=s/(x+y*s) \approx s/x=s/(k*t*b*f+i)$, and the signal to noise ratio of the receiver is $snrx=s/(k*t*b*f)$, i=0 in a case in which there is no co-channel interference. When the signal to noise ratio is converted into a dB scale unit and it is supposed that $Nth=10*\log(k*t*b*f)$, SNR=S−Nth.

When the low power signal power SA is, for example, −90 dBm, the corresponding signal to noise ratio SNRA is calculated: $SNRA=SA-Nth=SA-10*\log(k*t*b*f)=SA-10*\log(k*t*b)-NF$.

SA is −90 dBm, k and b are constants; t is temperature detected by a TEMP SENSOR and notified to a CONTROL UNIT; NF is a noise figure and is read from a FLASH by the CONTROL UNIT. SNRA is denoted by a signal to noise ratio of a low power signal in a case in which there is no co-channel signal interference.

Figure 3:
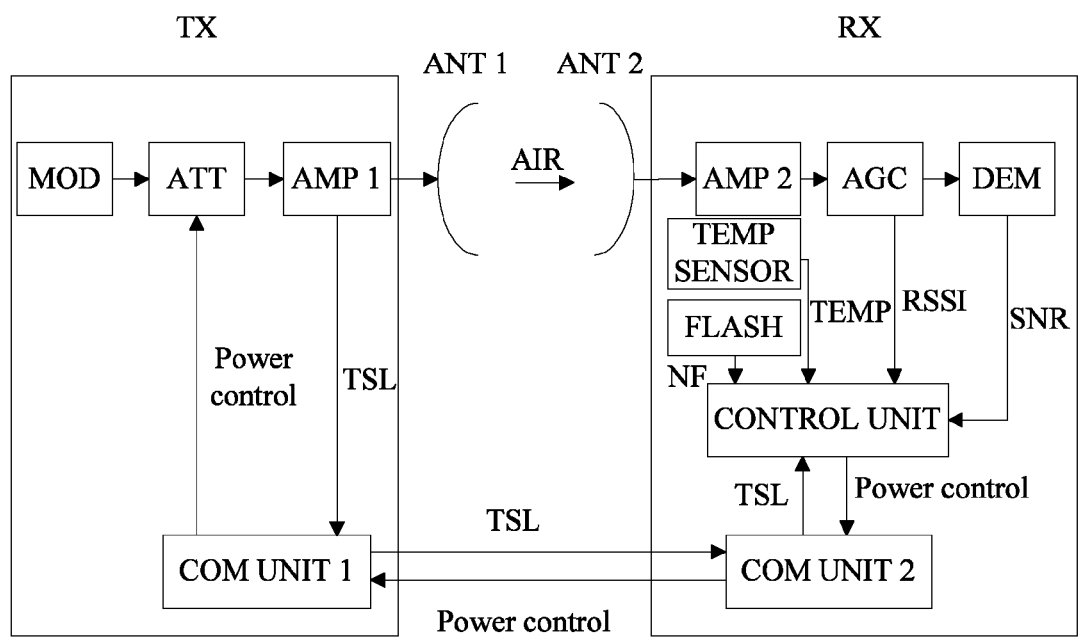
FIG. 3 is a schematic diagram of a method for measuring co-channel signal interference according to Embodiment 1 of the present invention.

Specifically, reference may be made to FIG. 3. As shown in FIG. 3, the system includes a transmitter (TX), a transmit end antenna (ANT) 1, a receive end antenna ANT 2, and a receiver (RX). The transmitter TX includes a modulator (MOD), an attenuator (ATT), an amplifier (AMP) 1, and a communication unit (COM UNIT) 1. The receiver RX includes an amplifier AMP2, an AGC, a demodulator (DEM), a temperature sensor (TEMP SENSOR), a flash (FLASH), a control unit (CONTROL UNIT), and a communication unit (COM UNIT 2). A signal transmitted by the transmitter is transferred to the receive end by the ANT 1 through a free space, and the signal is received by the antenna ANT 2 and delivered to the receiver RX.

The transmitter may control a transmit power of a signal output to an antenna by controlling ATT attenuation. In a typical case, a transmit power adjustment range is around 23 dB. A power control signal is transmitted by the CONTROL UNIT located in the RX, and is transferred to the ATT through two communication units, the COM UNIT 1 and the COM UNIT 2, to implement power control. Communication between the COM UNIT 1 and the COM UNIT 2 may be implemented by using an overhead channel of the system and may also be implemented by using a public telephone network. As an optional function, an actual transmit power of the TX may be fed back to the CONTROL UNIT by the COM UNIT 1 and the COM UNIT 2, to help monitor an operating status of the TX and implement fault determining.

The AGC of the receiver RX has a power detection function and may detect a power of a signal output by the antenna ANT 2 to the RX, and then the CONTROL UNIT is notified by using a received signal strength indication (RSSI).

The TEMP SENSOR of the receiver RX detects internal temperature of the receiver and notifies the CONTROL UNIT.

The demodulator DEM of the receiver RX may detect signal to noise ratio of a received signal. For example, the signal to noise ratio of the received signal may be measured by detecting a mean square error of the received signal, and the signal to noise ratio signal is sent to the CONTROL UNIT.

A noise figure NF of the receiver RX is measured during production and is written into the flash FLASH of the receiver RX, so that the noise figure can be read and used by the CONTROL UNIT.

Step 102. Measure several groups of receive powers and signal to noise ratios of the receiver, where each group includes two signal to noise ratios and receive powers corresponding to the two signal to noise ratios, and a difference between the two signal to noise ratios of each group is equal to or greater than 2 dB, and calculate, according to the several groups of receive powers and signal to noise ratios of the receiver, a signal to noise ratio of the low power signal during actual operation of the receiver.

The receive power is an unamplified power of the received signal, that is, the power of the signal received by the antenna ANT 2 in FIG. 3. The signal to noise ratio may be a signal to noise ratio of the received signal before amplification or after amplification.

Preferably, at least more than one group of receive powers and signal to noise ratios of the receiver are measured, where each group includes two signal to noise ratios and receive powers corresponding to the two signal to noise ratios, and a difference between the two signal to noise ratios of each group is equal to or greater than 2 dB, each group of signal to noise ratios of the low power signal during actual operation of the receiver is calculated according to each group of receive powers and signal to noise ratios of the receiver, and the at least more than one group of at least more than one obtained signal to noise ratios of the low power signal during actual operation are averaged to obtain the signal to noise ratio of the low power signal during actual operation of the receiver.

As an exemplary embodiment, one group of receive powers and signal to noise ratios of the receiver are measured, where (s1, snr1) and (s2, snr2) are obtained, snr1=s1/(x+y*s1) and snr2=s2/(x+y*s2) are obtained according to a total signal to noise ratio formula snr=s/(x+y*s), the following formula is obtained according to the one group of receive powers and signal to noise ratios of the receiver:

$$x = \frac{(snr2 - snr1) * s1 * s2}{(s2 - s1) * snr1 * snr2};$$

and the following formula is obtained according to SNRB=10*log(sa)−10*log x:

$$SNRB = 10 * \log\left(\frac{sa * snr1 * snr2 * (s2 - s1)}{s1 * s2 * (snr2 - snr1)}\right)$$

where $$SA = 10 * \log(sa).$$

Specifically, assuming that the CONTROL UNIT controls the TX to transmit a high power signal, the RX measures a receive power, which is denoted by s1 (unit: mw) or S1 (unit: dBm).

Figure 4:
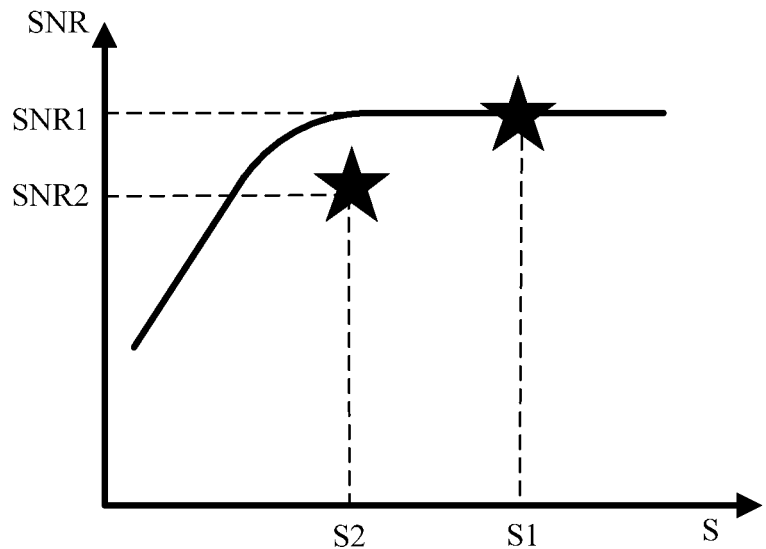
FIG. 4 is a schematic diagram of a method for measuring co-channel signal interference according to Embodiment 1 of the present invention.

At the same time, the RX measures a signal to noise ratio of the received signal, which is denoted by snr1 (without a unit) or SNR1 (unit: dB). The measurement point (S1, SNR1) is marked as (S1, SNR1) in FIG. 4.

Assuming that the CONTROL UNIT controls the TX to transmit a low power signal, the RX measures receive power, which is denoted by s2 (unit: mw) or S2 (unit: dBm).

At the same time, the RX measures a signal to noise ratio of the received signal, which is denoted by snr2 (without a unit) or SNR2 (unit: dB). The measurement point (S2, SNR2) is marked as (S2, SNR2) in FIG. 4.

Equations of the one group of signal to noise ratios of the receiver are created according to the signal to noise ratio equation of the receiver, that is:

snr1=s1/(x+y*s1)

snr2=s2/(x+y*s2).

Specifically, parameters x and y may be calculated by using snr1=s1/(x+y*s1) and snr2=s2/(x+y*s2), and a signal to noise ratio that is also at a low power signal power SA is estimated. In a case of a low power signal, total noise approximates signal-independent noise x, that is, according to the signal to noise ratio equation of the low power signal SNR=S−10*log x and according to SNRB=10*log(sa)−10*log x, the following formula is obtained:

$$SNRB = 10 * \log\left(\frac{sa * snr1 * snr2 * (s1 - s2)}{s1 * s2 * (snr1 - snr2)}\right)$$

where sa=10^(SA/10), and the SNRB is the signal to noise ratio of the low power signal during actual operation.

As another exemplary embodiment, one group of a minimum receive power and a signal to noise ratio of the receiver as well as a maximum receive power and a signal to noise ratio of the receiver are measured, where ($s_{min}$, $snr_{min}$) and ($s_{max}$, $snr_{max}$) are obtained, where snr=s/(x+y*s), $snr_{min}=s_{min}/(x+y*s_{min})$ and $snr_{max}=s_{max}/(x+y*s_{max})$ are obtained according to a total signal to noise ratio formula. The following formula is obtained according to the one group of receive powers and signal to noise ratios of the receiver:

$$x = \frac{(snr_{max} - snr_{min}) * s_{min} * s_{max}}{(s_{max} - s_{min}) * snr_{min} * snr_{max}};$$

and the following formula is obtained according to SNRB=10*log(sa)−10*log x:

$$SNRB = 10 * \log\left(\frac{sa * snr_{min} * snr_{max} * (s_{max} - s_{min})}{s_{min} * s_{max} * (snr_{max} - snr_{min})}\right)$$

where SA=10*log(sa).

Step 103. Obtain, according to the signal to noise ratio of the low power signal in a case in which there is no co-channel signal interference and according to the signal to noise ratio of the low power signal during actual operation, interference noise of the co-channel signal interference.

Specifically, the interference noise DS is obtained according to DS=SNRA−SNRB.

Step 104. Obtain, according to the interference noise of the co-channel signal interference, an interference power of the co-channel signal interference by using a power superposition algorithm.

Specifically, the following formula is obtained according to that total noise caused by co-channel interference is equal to thermal noise plus interference noise:

$$10^{\frac{Nth}{10}} + 10^{\frac{I}{10}} = 10^{\frac{Nth+DS}{10}}$$

where Nth is thermal noise, I is the interference power, and Nth+DS is the total noise caused by the co-channel interference.

When a power of the receiver is a low power signal power, noise of the receiver approximates superposition of thermal noise and interference signal noise. An interference signal power equation and an equation for a difference between the signal to noise ratio of the low power signal in a case in which there is no interference and the signal to noise ratio of the low power signal during actual operation are created according to the superposition; and the interference signal power is calculated according to the equations.

Figure 5:
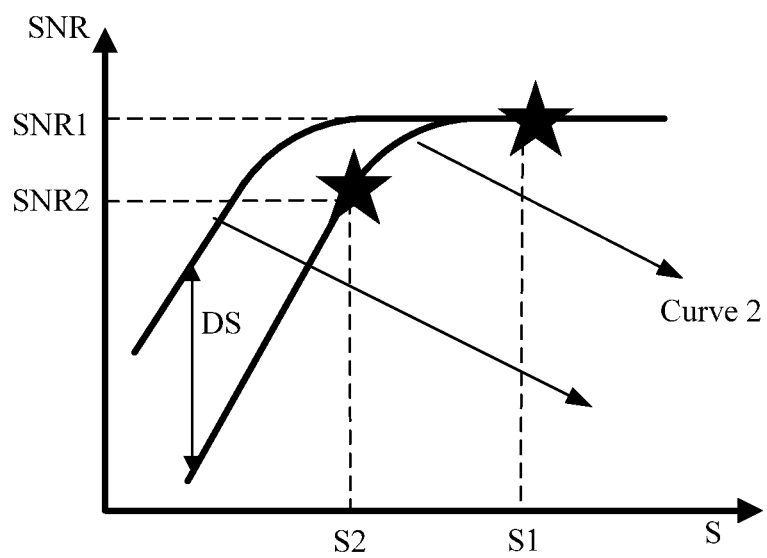
FIG. 5 is a schematic diagram of a method for measuring co-channel signal interference according to Embodiment 1 of the present invention.

Specifically, as shown in FIG. 5, a theoretical signal to noise ratio curve will drop from Curve 1 to Curve 2 in FIG. 5 in a case in which there is interference. When the power of the receiver is a low power signal power, the noise of the receiver approximates the superposition of the thermal noise and the interference signal noise, that is, $$10^{\frac{Nth}{10}} + 10^{\frac{I}{10}};$$

in a case in which there is interference, a decibel scale value of the noise is Nth+DS, which is $$10^{\frac{Nth+DS}{10}}$$

after being converted into a linear scale, and the following formula is created:

$$10^{\frac{Nth}{10}} + 10^{\frac{I}{10}} = 10^{\frac{Nth+DS}{10}}.$$

The interference power I is solved:

$$I = 10 * \log\left(10^{\frac{Nth+DS}{10}} - 10^{\frac{Nth}{10}}\right).$$

The interference power I is calculated based on the equation.

In this embodiment of the present invention, assuming that a minimum detectable interference depends on a minimum measurable DS, and the minimum measurable DS that is actually measured can reach around 1 dB when a factor of measurement error is taken into account. If a symbol rate of a signal is 6 Mb/s, and a noise figure is 5 dB, a minimum measurable interference power according to this embodiment of the present invention is:

$I=10*\log(10^{\wedge}(Nth+1)/10-10^{\wedge}(Nth/10))$ $Nth=10*\log(k*t*b*f)=10*\log((1.38E-20)*(25+273.15)*(6E6))+5=-101$ dBm $I=10*\log(10^{\wedge}(-101+1)/10-10^{\wedge}(-101/10))=-107$ dBm Therefore, the minimum measurable interference power according to this embodiment of the present invention is −107 dBm.

In the present invention, a difference of more than 2 dB is required to exist between SNRs of two measurement points to ensure fitting precision of an SNR-S curve. In view of a general situation, assuming that the transmitter transmits a signal with a maximum power, a receive power of the receiver is within a range from −30 to −55 dBm, and is −40 dBm in a typical case. In this case, because the power of the signal is relatively high, the signal to noise ratio of the received signal mainly depends on signal-dependent noise, that is, snr=1/y. For a microwave system, a signal to noise ratio is around 36 dB, that is, 10*log(1/y)=36 and y=2.5E−4.

As transmit power decreases, receive power also decreases, and a signal to noise ratio reduces. It may be learned through calculation that SNR=S−10*log(k*t*b*f+y*s)=36 dB-2 dB=34 dB, where S=−63 dBm is solved according to y=2.5E−4.

In a typical case, a transmitter with a power adjustment range of −40-(−63)=23 dB is required in the present invention.

Therefore, in the method provided in this embodiment of the present invention, it is only required that a transmitter has a power adjustment range of 23 dB.

In addition, measurement data required to be collected in the present invention is a receive power and a signal to noise ratio, and these two measurements can be completed in seconds without the need of observing a bit error rate. In prior art 2, it takes several to tens of minutes to observe the bit error rate.

This embodiment of the present invention provides a method for measuring co-channel signal interference, where the method includes precisely obtaining, by measuring temperature and by using a stored noise figure, a signal to noise ratio of a low power signal in a case in which there is no co-channel signal interference; obtaining, by controlling a transmit power, at least one group of receive powers and signal to noise ratios of the receiver, to obtain a signal to noise ratio of the low power signal during actual operation; and calculating an interference power according to a difference between the signal to noise ratio of the low power signal in a case in which there is no co-channel interference and the signal to noise ratio of the low power signal during actual operation. In this way, it is achieved that a minimum measurable interference power is −107 dBm, a power adjustment range of a transmitter is 23 dB, and all measurements can be completed within seconds.

Embodiment 2

Figure 6:
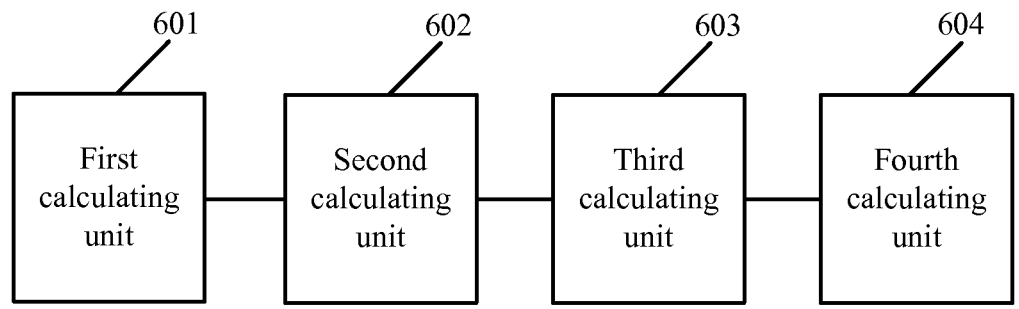
FIG. 6 is an apparatus structural diagram of a receiver according to Embodiment 2 of the present invention.
Figure 7:
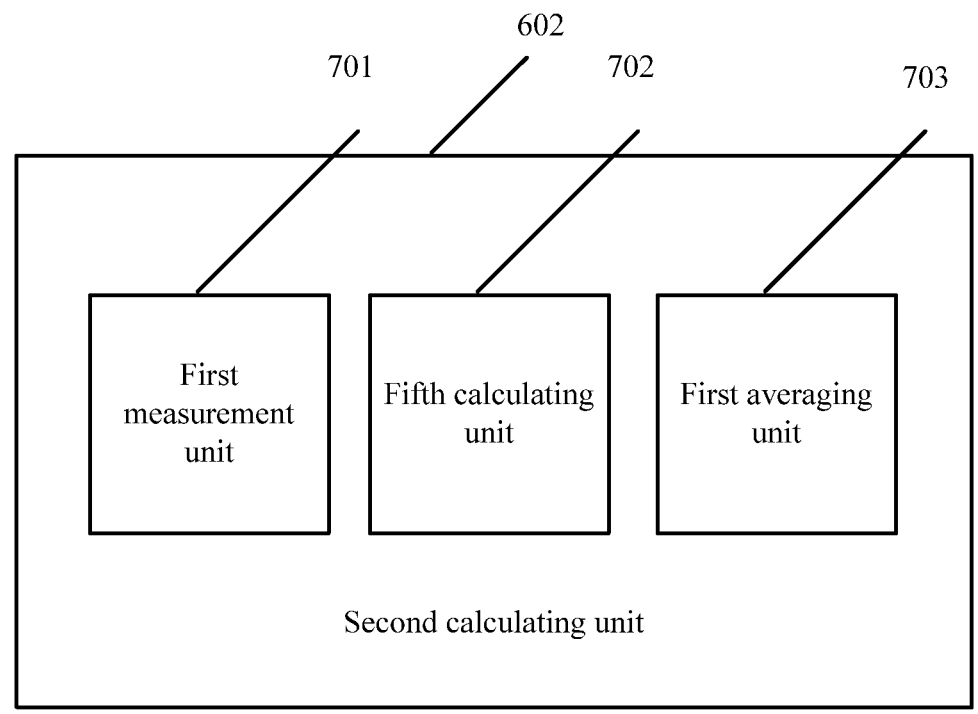
FIG. 7 is an apparatus structural diagram of a receiver according to Embodiment 2 of the present invention.
Figure 8:
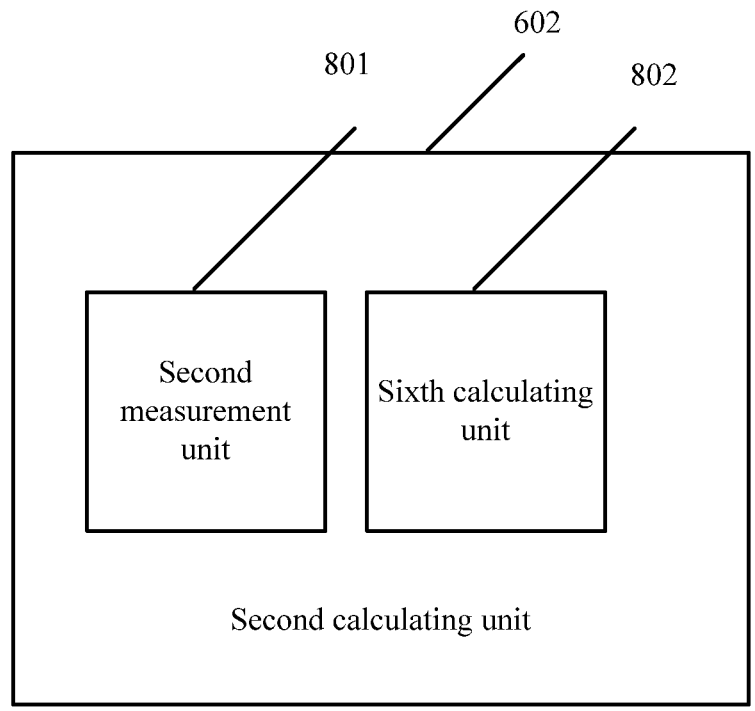
FIG. 8 is an apparatus structural diagram of a receiver according to Embodiment 2 of the present invention.
Figure 9:
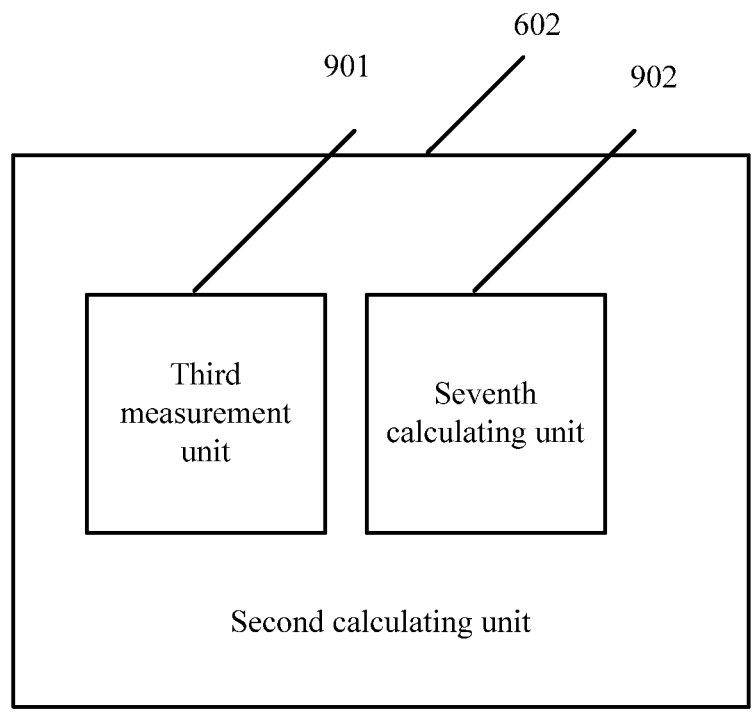
FIG. 9 is an apparatus structural diagram of a receiver according to Embodiment 2 of the present invention.

Referring to FIG. 6, FIG. 6 is an apparatus structural diagram of a receiver according to Embodiment 2 of the present invention. As shown in FIG. 6, the receiver includes the following units: a first calculating unit 601, a second calculating unit 602, a third calculating unit 603, and a fourth calculating unit 604.

The first calculating unit 601 measures temperature of an amplifier AMP of a receiver, and calculates, according to the temperature and a prestored noise figure of the receiver, a signal to noise ratio of a demodulator DEM of the receiver when the receiver receives a low power signal in a case in which there is no co-channel signal interference.

When a signal received by the receiver is a low power signal, the signal to noise ratio of the DEM of the receiver approximates signal-independent noise.

Specifically, the first calculating unit 601 is configured to measure temperature t of the receiver, and calculate, according to t, the prestored noise figure NF, and a total signal to noise ratio formula SNR=S−Nth, the signal to noise ratio SNRA of the low power signal in a case in which there is no co-channel signal interference, where SNRA=SA−(10*log (k*t*b)+NF), k is a Boltzmann's constant, t is absolute temperature, b is equivalent noise bandwidth, NF is the noise figure, and SA is a power of the low power signal received by the receiver.

The second calculating unit 602 measures several groups of receive powers and signal to noise ratios of the receiver, where each group includes two signal to noise ratios and receive powers corresponding to the two signal to noise ratios, and a difference between the two signal to noise ratios of each group is equal to or greater than 2 dB, and calculates, according to the several groups of receive powers and signal to noise ratios of the receiver, a signal to noise ratio of the low power signal during actual operation of the receiver.

Figure 2:
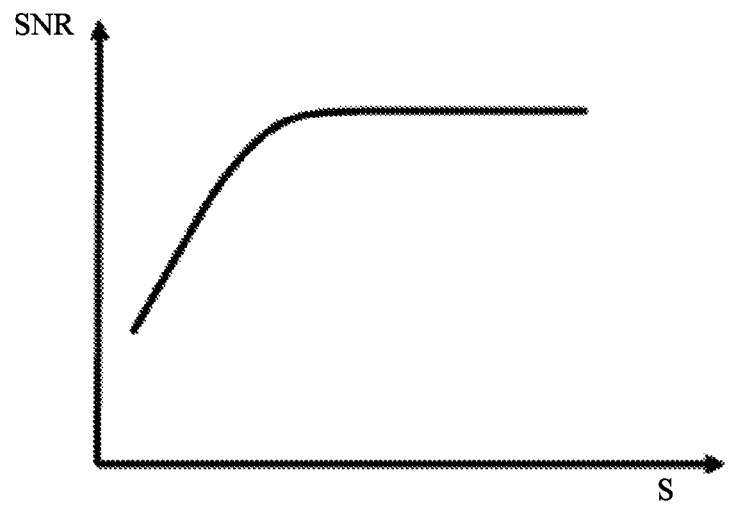
FIG. 2 is a schematic diagram of a method for measuring co-channel signal interference according to Embodiment 1 of the present invention.

The receive power is an unamplified power of the received signal, that is, the power of the signal received by the antenna ANT 2 in FIG. 2. The signal to noise ratio may be a signal to noise ratio of the received signal before amplification or after amplification.

Preferably, the second calculating unit 602 includes a first measurement unit 701, a fifth calculating unit 702, and a first averaging unit 703, where the first measurement unit 701 is configured to measure at least more than one group of receive powers and signal to noise ratios of the receiver, where each group includes two signal to noise ratios and receive powers corresponding to the two signal to noise ratios, and a difference between the two signal to noise ratios of each group is equal to or greater than 2 dB, where the fifth calculating unit 702 is configured to calculate, according to each group of receive powers and signal to noise ratios of the receiver, each group of signal to noise ratios of the low power signal during actual operation of the receiver, and where the first averaging unit 703 is configured to average the at least more than one group of the obtained at least more than one signal to noise ratios of the low power signal during actual operation, to obtain the signal to noise ratio of the low power signal during actual operation of the receiver.

As an exemplary embodiment, the second calculating unit 602 includes a second measurement unit 801 and a sixth calculating unit 802, where the second measurement unit 801 is configured to measure one group of receive powers and signal to noise ratios of the receiver, where (s1, snr1) and (s2, snr2) are obtained, and where the sixth calculating unit 802 is configured to: obtain snr1=s1/(x+y*s1) and snr2=s2/(x+y*s2) according to a total signal to noise ratio formula snr=s/(x+y*s); obtain the following formula according to the one group of receive powers and signal to noise ratios of the receiver:

$$x = \frac{(snr2 - snr1) * s1 * s2}{(s2 - s1) * snr1 * snr2};$$

and obtain the following formula according to SNRB=10*log(sa)−10*log x:

$$SNRB = 10 * \log\left(\frac{sa * snr1 * snr2 * (s2 - s1)}{s1 * s2 * (snr2 - snr1)}\right),$$

where SA=10*log(sa).

As another exemplary embodiment, the second calculating unit 602 includes a third measurement unit 901 and a seventh calculating unit 902, where the third measurement unit 901 is configured to measure one group of a minimum receive power and a signal to noise ratio of the receiver as well as a maximum receive power and a signal to noise ratio of the receiver, where ($s_{min}$, $snr_{min}$) and ($s_{max}$, $snr_{max}$) are obtained, where the seventh calculating unit 902 is configured to obtain $snr_{min}=s_{min}/(x+y*s_{min})$ and $snr_{max}=s_{max}/(x+y*s_{max})$ according to a total signal to noise ratio formula snr=s/(x+y*s), obtain the following formula according to the one group of receive powers and signal to noise ratios of the receiver:

$$x = \frac{(snr_{max} - snr_{min}) * s_{min} * s_{max}}{(s_{max} - s_{min}) * snr_{min} * snr_{max}},$$

and obtain the following formula according to SNRB=10*log(sa)−10*log x:

$$SNRB = 10 * \log\left(\frac{sa * snr_{min} * snr_{max} * (s_{max} - s_{min})}{s_{min} * s_{max} * (snr_{max} - snr_{min})}\right)$$

where SA=10*log(sa).

The third calculating unit 603 is configured to obtain, according to the signal to noise ratio of the low power signal in a case in which there is no co-channel signal interference and according to the signal to noise ratio of the low power signal during actual operation, interference noise of the co-channel signal interference.

Specifically, the interference noise DS is obtained according to DS=SNRA−SNRB.

The fourth calculating unit 604 is configured to obtain, according to the interference noise of the co-channel signal interference, an interference power of the co-channel signal interference by using a power superposition algorithm.

Specifically, the power superposition algorithm is obtained according to that total noise caused by co-channel interference is equal to thermal noise plus interference noise:

$$10^{\frac{Nth}{10}} + 10^{\frac{I}{10}} = 10^{\frac{Nth+DS}{10}}.$$

The interference power is obtained according to the power superposition algorithm:

$$I = 10 * \log\left(10^{\frac{Nth+DS}{10}} - 10^{\frac{Nth}{10}}\right)$$

where Nth is thermal noise, I is the interference power, and Nth+DS is the total noise caused by the co-channel interference.

In this embodiment of the present invention, assuming that a minimum detectable interference depends on a minimum measurable DS, and the minimum measurable DS that is actually measured can reach around 1 dB when a factor of measurement error is taken into account. If a symbol rate of a signal is 6 Mb/s, and a noise figure is 5 dB, a minimum measurable interference power according to this embodiment of the present invention is:

$I=10*\log(10^{\wedge}(Nth+1)/10-10^{\wedge}(Nth/10))$ $Nth=10*\log(k*t*b*f)=10*\log((1.38E-20)*(25+273.15)*(6E6))+5=-101$ dBm $I=10*\log(10^{\wedge}(-101+1)/10-10^{\wedge}(-101/10))=-107$ dBm Therefore, the minimum measurable interference power according to this embodiment of the present invention is −107 dBm.

In the present invention, a difference of more than 2 dB is required to exist between SNRs of two measurement points to ensure fitting precision of an SNR-S curve. In view of a general situation, assuming that the transmitter transmits a signal with a maximum power, a receive power of the receiver is within a range from −30 to −55 dBm, and is −40 dBm in a typical case. In this case, because the power of the signal is relatively high, the signal to noise ratio of the received signal mainly depends on signal-dependent noise, that is, snr=1/y. For a microwave system, a signal to noise ratio is around 36 dB, that is, $10*\log(1/y)=36$ and $y=2.5E-4$.

As transmit power decreases, receive power also decreases, and a signal to noise ratio reduces. It may be learned through calculation that $SNR=S-10*\log(k*t*b*f+y*s)=36$ dB-2 dB=34 dB, where S=−63 dBm is solved according to $y=2.5E-4$.

In a typical case, a transmitter with a power adjustment range of −40-(−63)=23 dB is required in the present invention.

Therefore, in the method provided in this embodiment of the present invention, it is only required that a transmitter has a power adjustment range of 23 dB.

In addition, measurement data required to be collected in the present invention is a receive power and a signal to noise ratio, and these two measurements can be completed in seconds without the need of observing a bit error rate. In prior art 2, it takes several to tens of minutes to observe the bit error rate.

This embodiment of the present invention provides a receiver, where the receiver precisely obtains, by measuring temperature and by using a stored noise figure, a signal to noise ratio of a low power signal in a case in which there is no co-channel signal interference; obtains, by controlling a transmit power, at least one group of receive powers and signal to noise ratios of the receiver, to obtain a signal to noise ratio of the low power signal during actual operation; and calculates an interference power according to a difference between the signal to noise ratio of the low power signal in a case in which there is no co-channel signal interference and the signal to noise ratio of the low power signal during actual operation. In this way, it is achieved that a minimum measurable interference power is −107 dBm, a power adjustment range of a transmitter is 23 dB, and all measurements can be completed within seconds.

Embodiment 3

Figure 10:
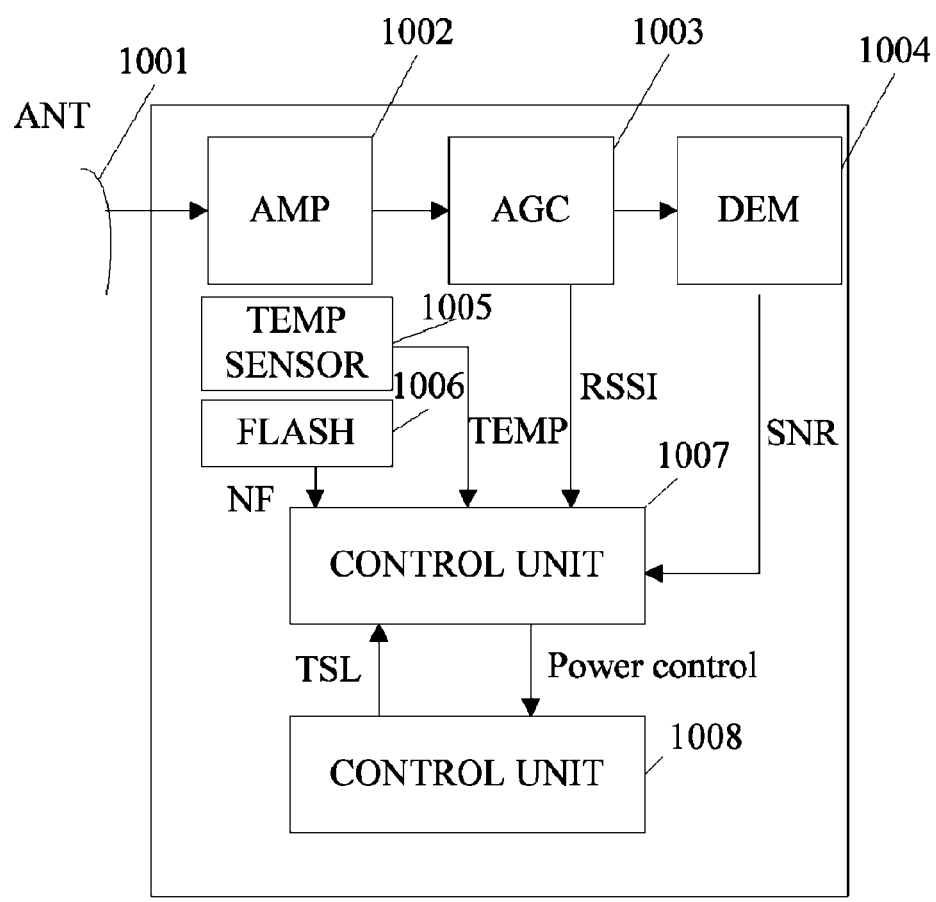
FIG. 10 is an apparatus structural diagram of a receiver according to Embodiment 3 of the present invention.

Referring to FIG. 10, FIG. 10 is an apparatus structural diagram of a receiver according to Embodiment 3 of the present invention. Referring to FIG. 10, FIG. 10 shows a receiver 1000 according to this embodiment of the present invention, and a specific embodiment of the present invention sets no limitation on specific implementation of the receiver. The receiver 1000 includes: a receive end antenna ANT 1001, an amplifier AMP 1002, an AGC 1003, a demodulator (DEM) 1004, a temperature sensor (TEMP SENSOR) 1005, a flash (FLASH) 1006, a control unit (CONTROL UNIT) 1007, and a communication unit (COM UNIT) 1008.

The receive end antenna ANT 1001 receives a signal transmitted by a transmitter and delivers it to a receiver RX 1000.

The AGC 1003 of the receiver RX has a power detection function and may detect a power of a signal output by the antenna ANT 1001 to the RX, and then the CONTROL UNIT 1007 is notified by using a received signal strength indication (RSSI).

The TEMP SENSOR 1005 of the receiver RX detects internal temperature of the receiver and notifies the CONTROL UNIT 1007.

The demodulator DEM 1004 of the receiver RX may detect signal to noise ratio of a received signal. For example, the signal to noise ratio of the received signal may be measured by detecting a mean square error of the received signal, and the signal to noise ratio signal is sent to the CONTROL UNIT 1007.

A noise figure NF of the receiver RX is measured during production and is written into the flash (FLASH) 1006 of the receiver RX, so as that the noise figure can be read and used by the CONTROL UNIT 1007.

The foregoing descriptions are merely preferred implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. A method for measuring co-channel signal interference, the method comprising:

measuring temperature of an amplifier AMP of a receiver;

calculating, according to the temperature and a prestored noise figure of the receiver, a signal to noise ratio of a demodulator DEM of the receiver when the receiver receives a low power signal in a case in which there is no co-channel signal interference;

measuring several groups of receive powers and signal to noise ratios of the receiver, wherein each group comprises two signal to noise ratios and receive powers corresponding to the two signal to noise ratios, and wherein a difference between the two signal to noise ratios of each group is equal to or greater than 2 dB;

calculating, according to the several groups of receive powers and signal to noise ratios of the receiver, a signal to noise ratio of the low power signal during actual operation of the receiver;

obtaining, according to the signal to noise ratio of the low power signal in a case in which there is no co-channel signal interference and according to the signal to noise ratio of the low power signal during actual operation, interference noise of the co-channel signal interference; and obtaining, according to the interference noise of the co-channel signal interference, an interference power of the co-channel signal interference by using a power superposition algorithm.

2. The method according to claim 1, wherein measuring the temperature of the receiver, and calculating, according to the temperature and the prestored noise figure, the signal to noise ratio of the low power signal in the case in which there is no co-channel signal interference comprises:

measuring temperature t of the receiver; and calculating, according to t, the prestored noise figure NF, and a total signal to noise ratio formula SNR=S−Nth, the signal to noise ratio SNRA of the low power signal in the case in which there is no co-channel signal interference, wherein $SNRA=SA-(10*\log(k*t*b))+NF$, k is a Boltzmann's constant, t is absolute temperature, b is equivalent noise bandwidth, NF is the noise figure, and SA is a power of the low power signal received by the receiver.

3. The method according to claim 1, wherein measuring several groups of receive powers and signal to noise ratios of the receiver, wherein each group comprises two signal to noise ratios and receive powers corresponding to the two signal to noise ratios, and wherein the difference between the two signal to noise ratios of each group is equal to or greater than 2 dB, and calculating, according to the several groups of receive powers and signal to noise ratios of the receiver, the signal to noise ratio of the low power signal during actual operation of the receiver comprises:

measuring at least one group of receive powers and signal to noise ratios of the receiver, wherein each group comprises two signal to noise ratios and receive powers corresponding to the two signal to noise ratios, and wherein the difference between the two signal to noise ratios of each group is equal to or greater than 2 dB;

calculating, according to each group of receive powers and signal to noise ratios of the receiver, each group of signal to noise ratios of the low power signal during actual operation of the receiver; and averaging the at least one group of obtained signal to noise ratios of the low power signal during actual operation to obtain the signal to noise ratio of the low power signal during actual operation of the receiver.

4. The method according to claim 1, wherein measuring several groups of receive powers and signal to noise ratios of the receiver, wherein each group comprises two signal to noise ratios and receive powers corresponding to the two signal to noise ratios, and wherein the difference between the two signal to noise ratios of each group is equal to or greater than 2 dB, and calculating, according to the several groups of receive powers and signal to noise ratios of the receiver, the signal to noise ratio of the low power signal during actual operation of the receiver comprises:

measuring one group of receive powers and signal to noise ratios of the receiver, wherein (s1, snr1) and (s2, snr2) are obtained;

obtaining snr1=s1/(x+y*s1) and snr2=s2/(x+y*s2) according to a total signal to noise ratio formula snr=s/(x+y*s);

obtaining the following formula according to the one group of receive powers and signal to noise ratios of the receiver:

$$x = \frac{(snr2 - snr1) * s1 * s2}{(s2 - s1) * snr1 * snr2};$$

and obtaining the following formula according to SNRB=10*log(sa)−10*log x:

$$SNRB = 10 * \log\left(\frac{sa * snr1 * snr2 * (s2 - s1)}{s1 * s2 * (snr2 - snr1)}\right),$$

wherein SA=10*log(sa), s1 and s2 are receive powers of the receiver obtained by measurement; snr1 and snr2 are received signal to noise ratios obtained by measurement; x is signal-independent noise, y is signal-dependent noise, SA is the power of the low power signal received by the receiver, sa is a linear scale of SA, and SNRB is the signal to noise ratio of the low power signal during actual operation of the receiver.

5. The method according to claim 1, wherein measuring several groups of receive powers and signal to noise ratios of the receiver, wherein each group comprises two signal to noise ratios and receive powers corresponding to the two signal to noise ratios, and wherein the difference between the two signal to noise ratios of each group is equal to or greater than 2 dB, and calculating, according to the several groups of receive powers and signal to noise ratios of the receiver, a signal to noise ratio of the low power signal during actual operation of the receiver comprises:

measuring one group of a minimum receive power and a signal to noise ratio of the receiver as well as a maximum receive power and a signal to noise ratio of the receiver, wherein ($s_{min}$, $snr_{min}$) and ($s_{max}$, $snr_{max}$) are obtained;

obtaining $snr_{min}=s_{min}/(x+y*s_{min})$ and $snr_{max}=s_{max}/(x+y*s_{max})$ according to a total signal to noise ratio formula snr=s/(x+y*s);

obtaining the following formula according to the one group of receive powers and signal to noise ratios of the receiver:

$$x = \frac{(snr_{max} - snr_{min}) * s_{min} * s_{max}}{(s_{max} * s_{min}) * snr_{min} * snr_{max}};$$

and obtaining the following formula according to SNRB=10*log(sa)−10*log x:

$$SNRB = 10 * \log\left(\frac{sa * snr_{min} * snr_{max} * (s_{max} - s_{min})}{s_{min} * s_{max} * (snr_{max} - snr_{min})}\right)$$

wherein SA=10*log(sa), $s_{min}$ is the minimum receive power of the receiver, and $s_{max}$ is the maximum receive power of the receiver; $snr_{min}$ is the signal to noise ratio of the receiver obtained by measurement at the minimum receive power, and $snr_{max}$ is the signal to noise ratio of the receiver obtained by measurement at the maximum receive power; x is signal-independent noise, y is signal-dependent noise, SA is the power of the low power signal received by the receiver, sa is a linear scale of SA, and SNRB is the signal to noise ratio of the low power signal during actual operation of the receiver.

6. The method according to claim 1, wherein obtaining, according to the signal to noise ratio of the low power signal in the case in which there is no co-channel signal interference and according to the signal to noise ratio of the low power signal during actual operation, interference noise comprises obtaining the interference noise DS according to DS=SNRA−SNRB.

7. The method according to claim 6, wherein obtaining, according to the interference noise, the interference power by using the power superposition algorithm comprises:

obtaining the power superposition algorithm according to that total noise caused by co-channel interference is equal to thermal noise plus interference noise:

$$10^{\frac{Nth}{10}} + 10^{\frac{I}{10}} = 10^{\frac{Nth+DS}{10}};$$

and obtaining the interference power according to the power superposition algorithm:

$$I = 10 * \log\left(10^{\frac{Nth+DS}{10}} - 10^{\frac{Nth}{10}}\right),$$

wherein Nth is thermal noise, I is the interference power, and Nth+DS is the total noise caused by the co-channel interference.

8. A receiver comprising:

a first calculating unit configured to measure a temperature of an amplifier AMP of a receiver, and calculate, according to the temperature and a prestored noise figure of the receiver, a signal to noise ratio of a demodulator DEM of the receiver when the receiver receives a low power signal in a case in which there is no co-channel signal interference;

a second calculating unit configured to measure several groups of receive powers and signal to noise ratios of the receiver, wherein each group comprises two signal to noise ratios and receive powers corresponding to the two signal to noise ratios, and wherein a difference between the two signal to noise ratios of each group is equal to or greater than 2 dB, and calculate, according to the several groups of receive powers and signal to noise ratios of the receiver, a signal to noise ratio of the low power signal during actual operation of the receiver;

a third calculating unit configured to obtain, according to the signal to noise ratio of the low power signal in the case in which there is no co-channel signal interference and according to the signal to noise ratio of the low power signal during actual operation, interference noise of the co-channel signal interference; and a fourth calculating unit configured to obtain, according to the interference noise of the co-channel signal interference, an interference power of the co-channel signal interference by using a power superposition algorithm.

9. The receiver according to claim 8, wherein the first calculating unit is configured to measure a temperature t of the receiver, and calculate, according to t, the prestored noise figure NF, and a total signal to noise ratio formula SNR=S−Nth, the signal to noise ratio SNRA of the low power signal in a case in which there is no co-channel signal interference, wherein SNRA=SA−(10*log(k*t*b)+NF), k is a Boltzmann's constant, t is absolute temperature, b is equivalent noise bandwidth, NF is the noise figure, and SA is a power of the low power signal received by the receiver.

10. The receiver according to claim 8, wherein the second calculating unit comprises:

a first measurement unit configured to measure at least one group of receive powers and signal to noise ratios of the receiver, wherein each group comprises two signal to noise ratios and receive powers corresponding to the two signal to noise ratios, and wherein a difference between the two signal to noise ratios of each group is equal to or greater than 2 dB;

a fifth calculating unit configured to calculate, according to each group of receive powers and signal to noise ratios of the receiver, each group of signal to noise ratios of the low power signal during actual operation of the receiver; and a first averaging unit configured to average the at least one group of obtained signal to noise ratios of the low power signal during actual operation, to obtain the signal to noise ratio of the low power signal during actual operation of the receiver.

11. The receiver according to claim 8, wherein the second calculating unit comprises:

a second measurement unit configured to measure one group of receive powers and signal to noise ratios of the receiver, wherein (s1, snr1) and (s2, snr2) are obtained; and a sixth calculating unit configured to:
obtain snr1=s1/(x+y*s1) and snr2=s2/(x+y*s2) according to a total signal to noise ratio formula snr=s/(x+y*s), wherein x is signal-independent noise, and y is signal-dependent noise;
obtain the following formula according to the one group of receive powers and signal to noise ratios of the receiver:

$$x = \frac{(snr2 - snr1) * s1 * s2}{(s2 - s1) * snr1 * snr2};$$

and
obtain the following formula according to SNRB=10*log(sa)−10*log x:

$$SNRB = 10 * \log\left(\frac{sa * snr1 * snr2 * (s2 - s1)}{s1 * s2 * (snr2 - snr1)}\right),$$

wherein SA=10*log(sa).

12. The receiver according to claim 8, wherein the second calculating unit comprises:

a third measurement unit configured to measure one group of a minimum receive power and a signal to noise ratio of the receiver as well as a maximum receive power and a signal to noise ratio of the receiver, wherein ($s_{min}$, $snr_{min}$) and ($s_{max}$, $snr_{max}$) are obtained; and a seventh calculating unit configured to:
obtain $snr_{min}=s_{min}/(x+y*s_{min})$ and $snr_{max}=s_{max}/(x+y*s_{max})$ according to a total signal to noise ratio formula snr=s/(x+y*s);
obtain the following formula according to the one group of receive powers and signal to noise ratios of the receiver:

$$x = \frac{(snr_{max} - snr_{min}) * s_{min} * s_{max}}{(s_{max} - s_{min}) * snr_{min} * snr_{max}};$$

and
obtain the following formula according to SNRB=10*log(sa)−10*log x:

$$SNRB = 10 * \log\left(\frac{sa * snr_{min} * snr_{max} * (s_{max} - s_{min})}{s_{min} * s_{max} * (snr_{max} - snr_{min})}\right)$$

wherein SA=10*log(sa).

13. The receiver according to claim 8, wherein the third calculating unit is configured to obtain the interference noise DS according to DS=SNRA−SNRB.

14. The receiver according to claim 13, wherein the fourth calculating unit is configured to:
obtain the power superposition algorithm according to that total noise caused by co-channel interference is equal to thermal noise plus interference noise:

$$10^{\frac{Nth}{10}} + 10^{\frac{I}{10}} = 10^{\frac{Nth+DS}{10}};$$

and
obtain the interference power according to the power superposition algorithm:

$$I = 10 * \log\left(10^{\frac{Nth+DS}{10}} - 10^{\frac{Nth}{10}}\right),$$

wherein Nth is thermal noise, I is the interference power, and Nth+DS is the total noise caused by the co-channel interference.

* * * * *